United States Patent [19]

Bailey

[11] 4,111,133

[45] Sep. 5, 1978

[54] APPARATUS FOR CONCEALING AUXILIARY EQUIPMENT AND METHODS OF CONSTRUCTING AND UTILIZING SAME

[76] Inventor: C. Richard Bailey, 31885 Nottingwood Dr., Farmington, Mich. 48018

[21] Appl. No.: 779,603

[22] Filed: Mar. 21, 1977

[51] Int. Cl.² .............................................. A47B 23/00
[52] U.S. Cl. ...................................... 108/45; 248/203; 312/204
[58] Field of Search ...................................... 108/44–46, 108/65, 69, 92, 97, 152; 248/203; 312/264

[56] References Cited

U.S. PATENT DOCUMENTS 2,867,484  1/1959  Jennings ................................ 108/215

FOREIGN PATENT DOCUMENTS 1,218,314  5/1960  France ........................................ 108/45
773,301  4/1957  United Kingdom ....................... 108/45

*Primary Examiner*—James C. Mitchell
*Attorney, Agent, or Firm*—Irving M. Weiner

[57] ABSTRACT

An apparatus for minimizing theft of auxiliary equipment from a vehicle by concealing such equipment. The apparatus serves the additional function of providing an easily accesible horizontal shelf for storing miscellaneous items. In particular, the apparatus is adapted to be slidably mounted and dismounted without the use of tools, and cooperates with conventional auxiliary radio installations within a vehicle.

6 Claims, 7 Drawing Figures

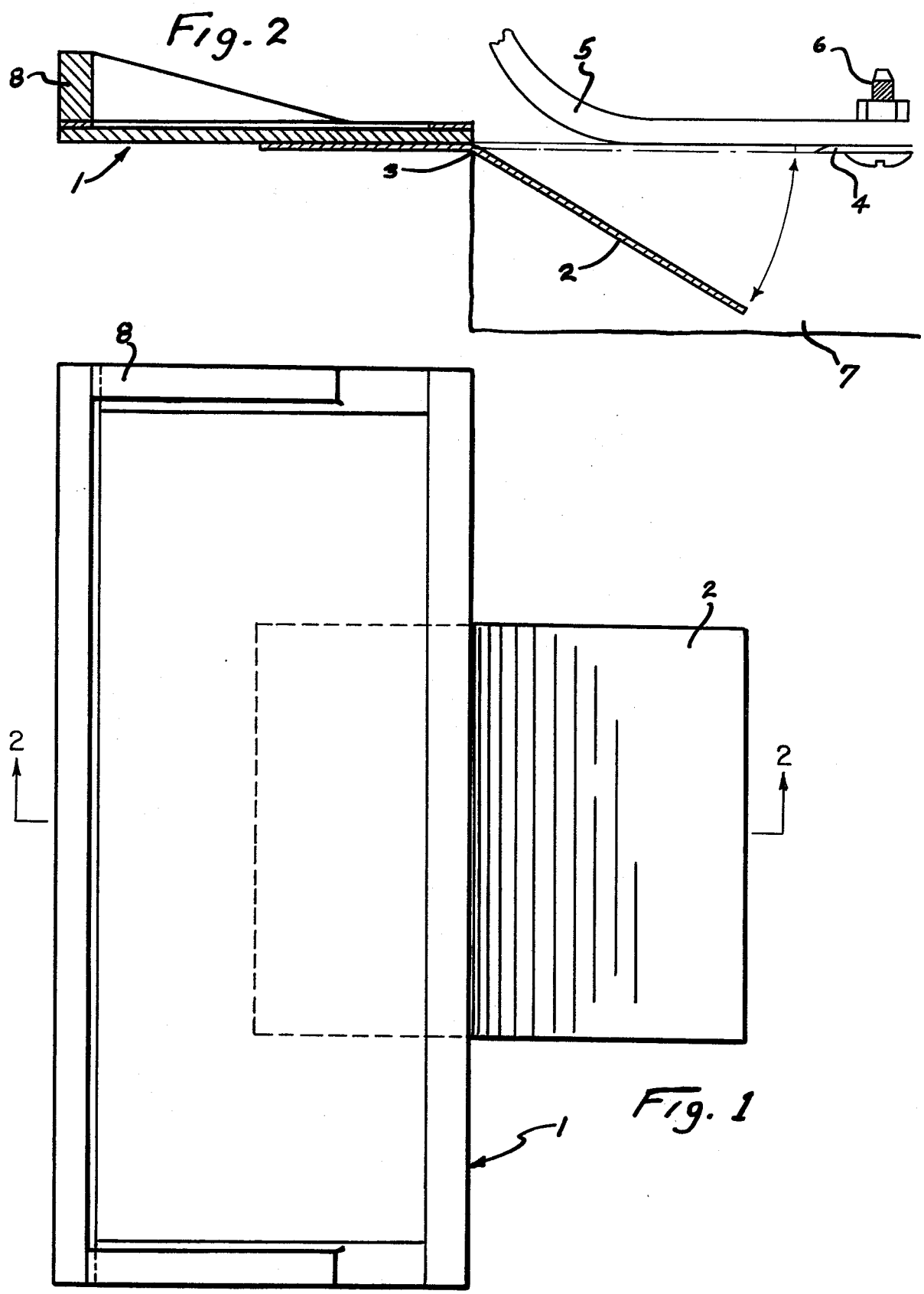

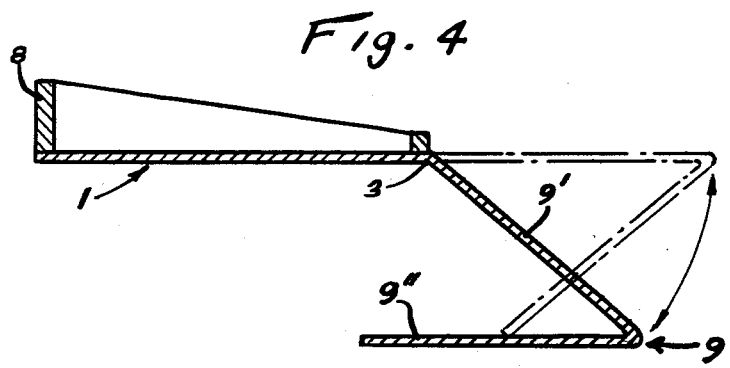
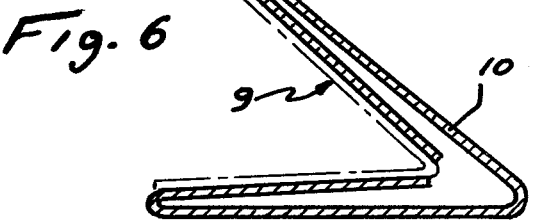
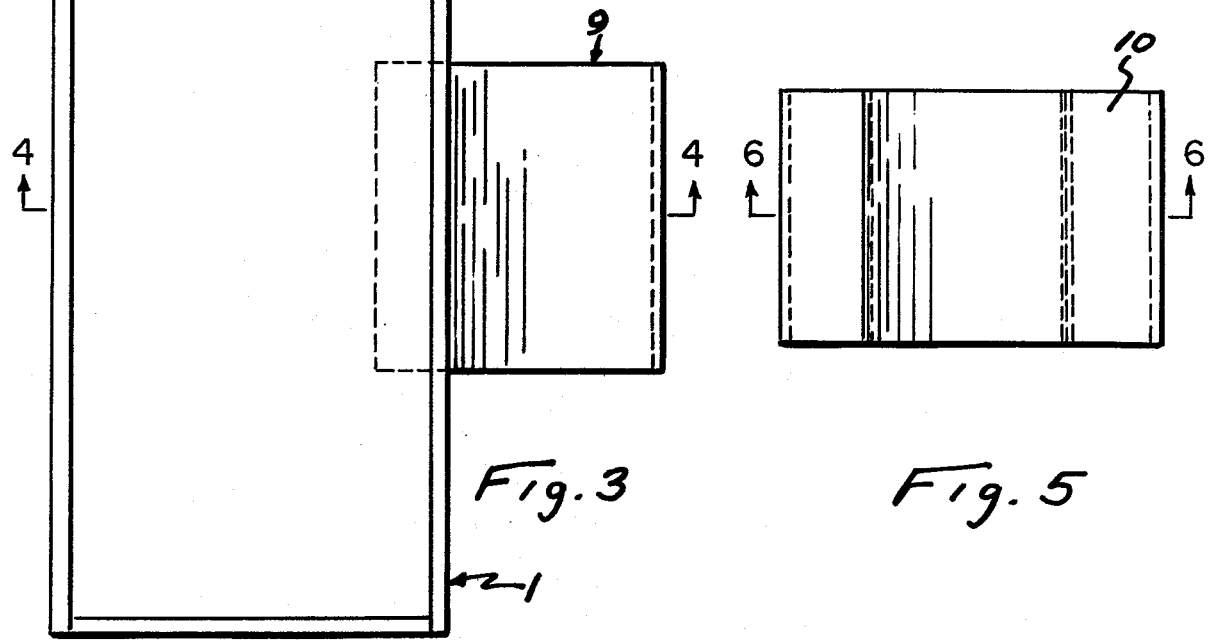
TRANSCEIVER

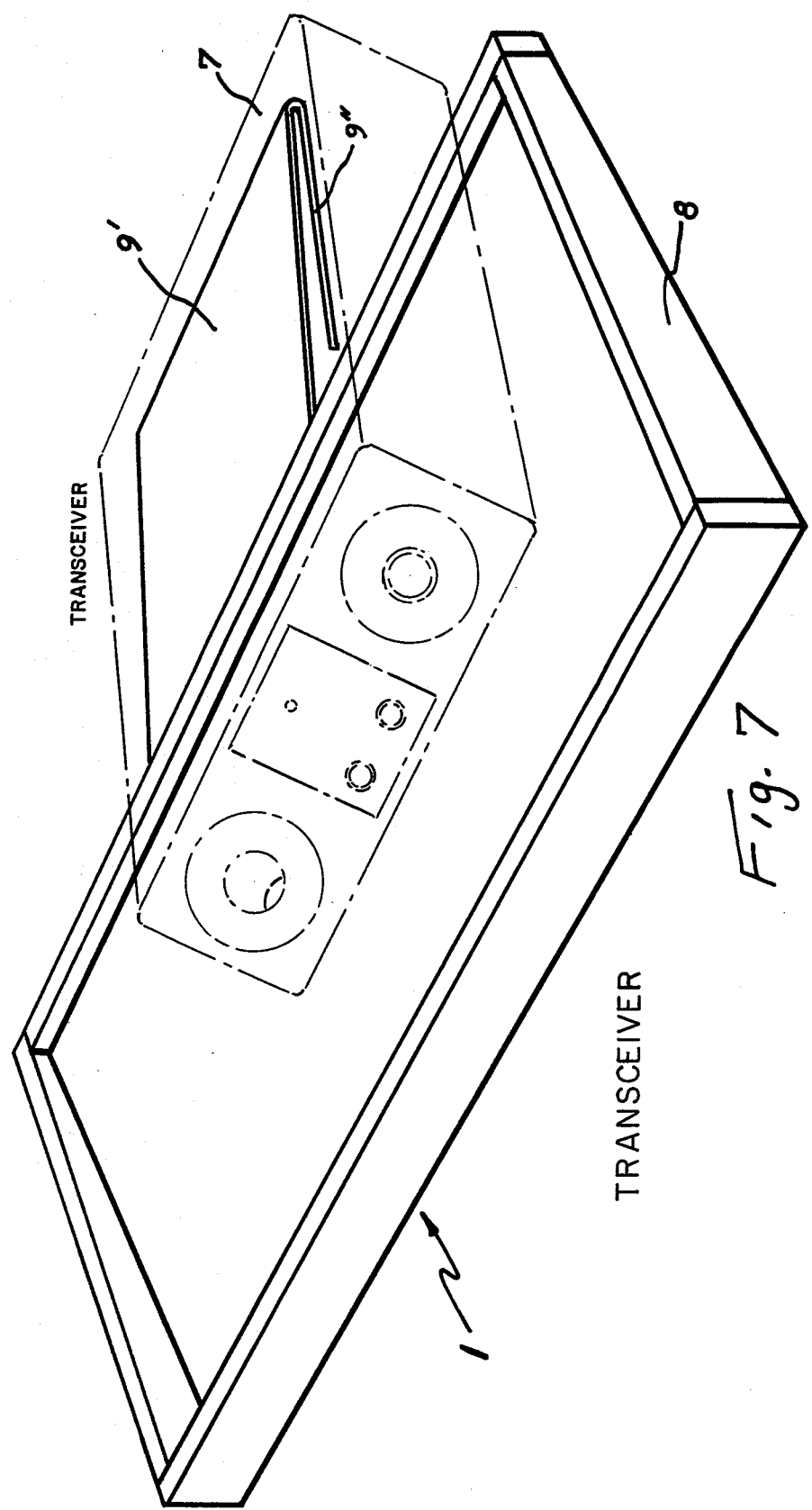

APPARATUS FOR CONCEALING AUXILIARY EQUIPMENT AND METHODS OF CONSTRUCTING AND UTILIZING SAME

BACKGROUND OF THE INVENTION

1. Field of the Invention

The present invention relates generally to an apparatus which is readily mounted to conceal auxiliary equipment in a vehicle, such as an auxiliary radio, to minimize theft of such equipment from the vehicle.

The terminology "vehicle" as used herein is intended to connote in particular automobiles such as cars, vans, and trucks, although various other types of vehicles are also embraced therein. The terminology "radio" as used herein is intended to particularly connote ham radio transceivers, citizens band radio transceivers, AM and/or FM radio receivers.

In particular, the present invention relates to a readily removable shelf member adapted to cooperate with conventional auxiliary radio installations in vehicles so as to minimize the chances for theft of such auxiliary radios from vehicles.

2. Description of the Prior Art

In view of the ever-increasing use of auxiliary radio equipment in vehicles, many attempts have been made to provide devices which will protect such equipment from theft, or to at least minimize the possibility of theft. Such devices have in the past been invariably awkward and inconvenient to use, or in the alternative have interfered with the use of the radio equipment. In addition, there have been attempts to provide devices which afford a storage place for miscellaneous items, and in particular for such items often used by the driver and/or passengers of vehicles. Heretofore, however, there has not been developed any generally acceptable device which has successfully provided both of the above-mentioned desirable features.

Illustrative of prior art attempts to provide the aforementioned functions are the devices disclosed in the following patents: U.S. Pat. No. 2,077,284 issued in 1937 to Te Pas entitled "AUTOMOBILE RADIO RECEIVER"; U.S. Pat. No. 2,887,216 issued in 1959 to Hargraves entitled "DISPENSER AND RECEPTACLE MOUNTING"; U.S. Pat. No. 3,135,392 issued in 1964 to Elkins entitled "CRIB CADDY"; U.S. Pat. No. 3,443,851 issued in 1969 to Earl entitled "EASY-TO-MOUNT AND EASY-TO-DISMOUNT STORAGE CONTAINER"; and U.S. Pat. No. 3,606,447 issued in 1971 to Ryding entitled "VEHICLE STEREO TAPE AND GLOVE COMPARTMENT."

The present invention eliminates the disadvantages and shortcomings attendant with the conventional prior art techniques, and at the same time provides an apparatus which employs a minimum of parts at an extremely reduced cost of manufacture.

SUMMARY OF THE INVENTION

The present invention provides an apparatus for minimizing theft of and for concealing auxiliary equipment in a vehicle, which includes a shelf member with a forward end and a rearward end, and mounting means disposed at the rearward end of the shelf member for removably securing the apparatus over the auxiliary equipment when the auxiliary equipment is in an installed position. The mounting means is adapted to be received between the auxiliary equipment and a predetermined portion of the vehicle, and is adjustably secured to the rearward end of the shelf member to permit the shelf member to be disposed in an accessible and substantially horizontal position when the apparatus is removably secured over the auxiliary equipment.

In a preferred embodiment of the invention, the mounting means comprises a bendable tongue adapted to be bent to vary the relative angular relationship between the tongue and the shelf member. The tongue is adapted to be tightly received within an auxiliary support structure for an auxiliary radio, between the auxiliary radio and a lower surface of a dashboard of the vehicle. The shelf member is provided with at least one upwardly extending peripheral edge portion. The tongue is further adapted to be slidably received within the auxiliary support structure and between the auxiliary radio and a lower surface of the dashboard to permit the apparatus to be selectively mounted and dismounted without the use of tools.

In another embodiment of the invention, the tongue comprises a substantially flexible V-shaped plate member which is compressibly tightly received within the auxiliary support structure between the auxiliary radio and the lower dashboard surface.

It is an object of the present invention to provide a readily mountable and dismountable concealing apparatus for auxiliary equipment in a vehicle, which is adapted to permit universal application of the apparatus to various types of auxiliary radio installations.

Other objects and details of the invention will become apparent from the following description, when read in conjunction with the accompanying drawings.

BRIEF DESCRIPTION OF THE DRAWINGS

FIG. 1 illustrates a top plan view of a first embodiment of the invention.

FIG. 2 depicts a view of the invention taken along line 2—2 of FIG. 1.

FIG. 3 is a top plan view of a second embodiment of the invention.

FIG. 4 is a view of the invention taken along line 4—4 of FIG. 3.

FIG. 5 is a top plan view of the embodiment of FIGS. 3 and 4 additionally provided with an adapter in accordance with the invention.

FIG. 6 is a view of the invention taken along line 6—6 of FIG. 5.

FIG. 7 illustrates a perspective view of the embodiment of the invention depicted in FIGS. 3 and 4, shown mounted over an auxiliary radio.

DETAILED DESCRIPTION OF SOME PREFERRED EMBODIMENTS

With reference to FIGS. 1 and 2, there is shown a first embodiment of the present invention including a shelf member 1 having mounting means comprising a substantially rectangular tongue 2 protruding from the rear portion thereof. The shelf 1 is fabricated of any suitable plastic, metal, wood, or other material which is substantially rigid. The tongue 2 is fabricated of any somewhat flexible material such as ductile sheet metal or flexible plastic, and is secured to the lower surface of shelf 1 by any suitable affixation means such as welding, adhesive, screws, bolts, clamps, etc. It should be noted that the tongue 2 is sufficiently flexible to permit bending thereof at the point 3 where the tongue 2 interconnects with the shelf 1 (FIG. 2), to thus permit the tongue 2 to be displaced angularly as indicated by the arrow in FIG. 2. This variability of the angular relationship between the shelf 1 and the tongue 2 is an essential feature of the invention, and will be discussed more thoroughly hereinbelow.

Referring particularly to FIG. 2, there is shown a vehicle dashboard 5 with a bracket 4 secured to the lower surface thereof by means of a bolt 6. An auxiliary radio 7, such as a ham or citizens band radio transceiver, is in turn mounted to the bracket 4 in an installed position. It should be noted that this particular auxiliary radio installation is shown for illustration only, and the present invention is adapted for use with the many variable types of installations currently available.

The apparatus is mounted by first bending the tongue 2 (cross-hatched) to the desired angular position relative to shelf 1. Such angular position is determined by that position which will permit the shelf 1 to be substantially horizontally disposed when the tongue 2 is substantially parallel to the lower surface of the dashboard 5. In the installation depicted in FIG. 2, such angular position relative to shelf 1 is 180°, although this angle will vary depending upon the particular type of installation and the contour of the lower surface of the dashboard 5 of any given vehicle. The tongue 2 (shown in phantom lines) is then inserted between the upper surface of the radio 7 and the lower surface of the dashboard 5 and is merely slid into position. It should be noted that it may be desirable to first insert the tongue 2 in its angularly displaced position (cross hatched) into the slot formed between the dashboard 5 and radio 7 and thereafter perform the aforementioned bending operation, thus ensuring that the shelf 1 will be properly horizontally disposed. It should be noted that although the tongue 2 is sufficiently flexible to permit bending thereof, it is further sufficiently rigid to permit the shelf 1 to be held in its horizontal position after the bending operation is completed.

It can thus be seen that the shelf 1 will serve to conceal the radio 7 from the eyes of passers-by, while at the same time affording the driver and/or passengers of the vehicle with a convenient, accessible shelf 1, which can be employed to store miscellaneous items such as maps, sunglasses, etc. In this connection, it is desirable that the shelf 1 be provided with upwardly-extending peripheral edge portions or walls 8 so as to effectively retain the aforesaid miscellaneous items on the shelf 1 as well as to generally give the shelf 1 more of a functional shelf look to further enhance the disguising capability of the apparatus.

With reference now to FIGS. 3 and 4, an alternate embodiment of the present invention is depicted. The shelf 1 is provided with mounting means in the form of a V-shaped tongue member 9. The tongue 9 is fabricated of substantially flexible material such as ductile metal or flexible plastic, and is flexible only to the extent that it can be compressed from the cross-hatched position thereof in FIG. 4 to the compressed position thereof depicted in FIG. 7. The tongue 9 in this embodiment is also adjustable relative to the point 3, as is tongue 2 described above. The tongue 9 is inserted between the top of a radio and the lower surface of a dashboard in substantially the same manner as described above with reference to tongue 2, with the tongue 9 being bent to the desired angular position relative to shelf 1 to permit the shelf 1 to be substantially horizontal in a mounted position. When inserting the tongue 9 between the top of the radio and the dashboard for mounting, the user merely compresses the two legs 9' and 9" towards each other and releases same after the tongue 9 has been fully inserted between the top of the radio and the dashboard in a mounted position. In this manner, the tongue 9 will be compressibly received to thus ensure tight engagement thereof within the space formed between the vehicle dashboard and the upper surface of the radio. This feature is of particular importance when considering that varying types of auxiliary radio installations provide varying space dimensions between the top of the radio and the lower surface of the dashboard, which dimension can vary from approximately 1/32 inch to over 1 inch. The compressibility of the tongue 9 permits the apparatus to accommodate most, if not all, of such varying space dimensions. It should be noted that in some types of installations there will be provided a horizontal portion of the bracket member disposed between the lower dashboard surface and the radio, in which case the tongue will be disposed within the space defined between the top surface of the auxiliary radio and the horizontal bracket portion.

Referring now to FIG. 7, the apparatus is depicted in a mounted position with the tongue 9 having its leg 9" bearing against the upper surface of the auxiliary radio 7 and the leg 9' bearing against the lower surface of the vehicle dashboard and/or the intermediate horizontal bracket portion discussed hereinabove, if such a bracket portion exists (not shown). The shelf 1 with peripheral edge portions or walls 8 is mounted in a substantially horizontal position over the radio 7.

In the event that the space dimension between the auxiliary radio and the lower surface of the dashboard and/or horizontal bracket portion is relatively large and will not permit a tight fit for the compressed tongue 9, an adapter as illustrated in FIGS. 5 and 6 can be employed to accommodate such relatively large space. In this embodiment of the invention, an adapter 10 is fitted over the tongue 9. The adapter 10 is fabricated of a ductile metal or flexible plastic as is tongue 9, and is of substantially V-shaped, double layered configuration as depicted in FIG. 6 to fit snugly over the outer face of the tongue 9. After the adapter 10 has been fitted over the tongue 9, the adapter 10 and tongue 9 are compressed as discussed above with regard to FIGS. 3 and 4 and are inserted into the space existing between the lower surface of the vehicle dashboard and the auxiliary radio. With the addition of adapter 10, the apparatus will be capable of being tightly mounted in a relatively large space between the dashboard and auxiliary radio.

In view of the various embodiments of the invention, depending upon the type of auxiliary radio installation provided in the vehicle, the particular type of tongue with or without adapter 10 can be selected to ensure secure mounting of the tongue in the space provided between the dashboard and the top of the auxiliary radio. In addition, it should be noted that the width dimension of either the tongue 2, the tongue 9, and the adapter 10 is adapted to be smaller than the width dimension of the bracket mounting the auxiliary radio in the vehicle, which bracket normally has a width dimension slightly greater than the width dimension of the auxiliary radio itself. Thus, the mounting means for the invention will be received within the bracket for the auxiliary radio as well as between the upper surface of such radio and the lower surface of the vehicle dashboard.

As can be seen from the foregoing description, in order to readily mount and dismount the apparatus in accordance with the invention the user merely performs a selective bending operation and slidably inserts the tongue into the designated space. The apparatus thus requires no tools for mounting and dismounting and requires only seconds to install. In addition, the auxiliary radio is permitted to remain in an installed position without the need for cumbersome mounting and dismounting thereof to avoid theft. To facilitate access to the radio control knobs, normally disposed on the forward face of the auxiliary radio, the user merely slidably dismounts the apparatus from its mounted position, or in the alternative may bend the shelf upwardly if desired. When not using the auxiliary radio, the shelf 1 is maintained in its mounted horizontal position to provide convenient storage of miscellaneous items, as well as to provide concealment of the auxiliary radio from the eyes of passers-by, especially when the vehicle is parked and/or left unattended. In this connection, it should be noted that it is most desirable that any conspicuous auxiliary antenna equipment disposed on the vehicle be of the type which is easily dismountable so that the driver may merely remove and conceal same when the vehicle is to be left unattended, to thus further enhance the theft-minimizing feature of the present invention.

Although there have been described what are at present considered to be the preferred embodiments of the invention, it will be understood that various modifications may be made therein, and it is intended to cover in the appended claims all such modifications as fall within the true spirit and scope of the present invention.

I claim:

1. An apparatus for minimizing theft of and for concealing radio equipment in a vehicle, comprising:
    a shelf member including a forward end and a rearward end;
    a bendable tongue protruding from said rearward end of said shelf member for removably securing said apparatus over said auxiliary radio equipment when said auxiliary radio equipment is in an installed position;
    said bendable tongue being adapted to be bent to vary the relative angular relationship between said tongue and said shelf member to permit said shelf member to be disposed in an accessible and substantially horizontal position to conceal said auxiliary radio equipment when said apparatus is removably secured over said auxiliary radio equipment;
    said bendable tongue being further adapted to be received within a conventional radio bracket member secured to a lower surface of a dashboard of said vehicle for mounting said auxiliary radio equipment in said installed position; and
    said bendable tongue being further adapted to be slidably received within said bracket member between said auxiliary radio equipment and said lower surface of said dashboard, to permit said apparatus to be selectively mounted and completely removed without the use of tools.

2. An apparatus in accordance with claim 1, wherein:
    said tongue comprises a flexible rectangular plate, said plate having a width dimension less than the width dimension of said bracket member.

3. An apparatus in accordance with claim 1, wherein:
    said tongue comprises a substantially V-shaped flexible plate member, said tongue being adapted to be compressibly tightly received within said bracket member between said auxiliary radio equipment and said lower surface of said dashboard, said tongue having a width dimension less than the width dimension of said bracket member.

4. An apparatus in accordance with claim 3, further comprising:
    a substantially V-shaped compressible double-layered adapter member for selective positioning over said V-shaped tongue to selectively increase the tight reception of said tongue between said auxiliary radio equipment and said lower surface of said dashboard.

5. An apparatus in accordance with claim 1, wherein:
    said shelf member is provided with at least one upwardly extending peripheral edge portion.

6. An apparatus in accordance with claim 3, wherein:
    said shelf member is provided with at least one upwardly extending peripheral edge portion.

* * * * *